United States Patent
Sung et al.

(10) Patent No.: US 10,732,909 B2
(45) Date of Patent: Aug. 4, 2020

(54) OPTIMIZING OPERATING ENVIRONMENT OF VIRTUAL MACHINE

(71) Applicant: Hewlett-Packard Development Company, L.P., Spring, TX (US)

(72) Inventors: In Soo Sung, Suwon-si (KR); Myeong Koo Kang, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/471,746

(22) PCT Filed: Dec. 21, 2017

(86) PCT No.: PCT/KR2017/015180
§ 371 (c)(1),
(2) Date: Jun. 20, 2019

(87) PCT Pub. No.: WO2018/124621
PCT Pub. Date: Jul. 5, 2018

(65) Prior Publication Data
US 2019/0347050 A1 Nov. 14, 2019

(30) Foreign Application Priority Data
Dec. 27, 2016 (KR) .......................... 10-2016-0180142

(51) Int. Cl.
*G06F 15/00* (2006.01)
*G06F 3/12* (2006.01)
(Continued)

(52) U.S. Cl.
CPC ............ *G06F 3/122* (2013.01); *G06F 3/1204* (2013.01); *G06F 3/1257* (2013.01);
(Continued)

(58) Field of Classification Search
CPC ...... G06F 3/122; G06F 3/1204; G06F 3/1257; G06F 9/44505; G06F 9/45533; G06F 12/0253; G06F 2212/1044; H04N 1/0097
(Continued)

(56) References Cited

U.S. PATENT DOCUMENTS 8,744,299 B2   6/2014   Osada
9,392,132 B1   7/2016   Iwasaki
(Continued)

FOREIGN PATENT DOCUMENTS

CN   1737789 A     2/2006
CN   101739572 A   6/2010
(Continued)

*Primary Examiner* — Douglas Q Tran
(74) *Attorney, Agent, or Firm* — Jefferson IP Law, LLP

(57) ABSTRACT

An image forming apparatus for optimizing an operating environment of a virtual machine executed therein includes a memory to store a computer executable instruction, and at least one processor to set the operating environment of the virtual machine by executing the computer executable instruction, based on configuration information regarding the operating environment of the virtual machine corresponding to one operating mode selected by a user from among operating modes of the virtual machine executed in the image forming apparatus.

19 Claims, 12 Drawing Sheets

(51) Int. Cl.
   *G06K 1/00*  (2006.01)
   *G06F 9/445* (2018.01)
   *G06F 9/455* (2018.01)
   *G06F 12/02* (2006.01)
   *H04N 1/00*  (2006.01)

(52) U.S. Cl.
   CPC ...... *G06F 9/44505* (2013.01); *G06F 9/45533* (2013.01); *G06F 12/0253* (2013.01); *H04N 1/0097* (2013.01); *G06F 2212/1044* (2013.01)

(58) Field of Classification Search
   USPC .............................. 358/1.13, 1.15, 1.14, 1.1
   See application file for complete search history.

(56) References Cited

U.S. PATENT DOCUMENTS

| | | |
|---|---|---|
| 2011/0126139 A1 | 5/2011 | Jeong et al. |
| 2015/0350472 A1* | 12/2015 | Hirota ................ H04N 1/00962 358/1.13 |
| 2016/0299725 A1* | 10/2016 | Hosoda .............. H04N 1/32765 |
| 2017/0264758 A1* | 9/2017 | Naito ...................... H04L 51/22 |

FOREIGN PATENT DOCUMENTS

| | | |
|---|---|---|
| CN | 103200020 A | 7/2013 |
| CN | 103581484 A | 2/2014 |
| CN | 103701934 A | 4/2014 |
| CN | 103902347 A | 7/2014 |
| CN | 105450450 A | 3/2016 |
| CN | 106406980 A | 2/2017 |
| KR | 1020100058328 A | 6/2010 |
| KR | 101393152 B1 | 5/2014 |
| WO | WO-2013115565 A2 | 8/2013 |

* cited by examiner

[Fig. 1]
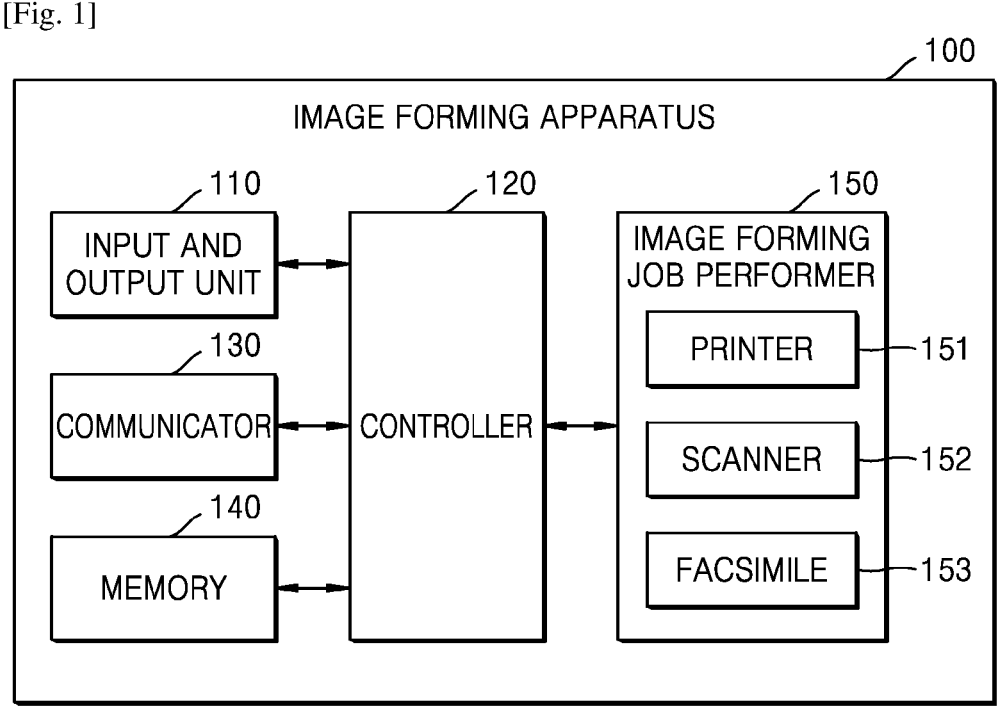

[Fig. 2]
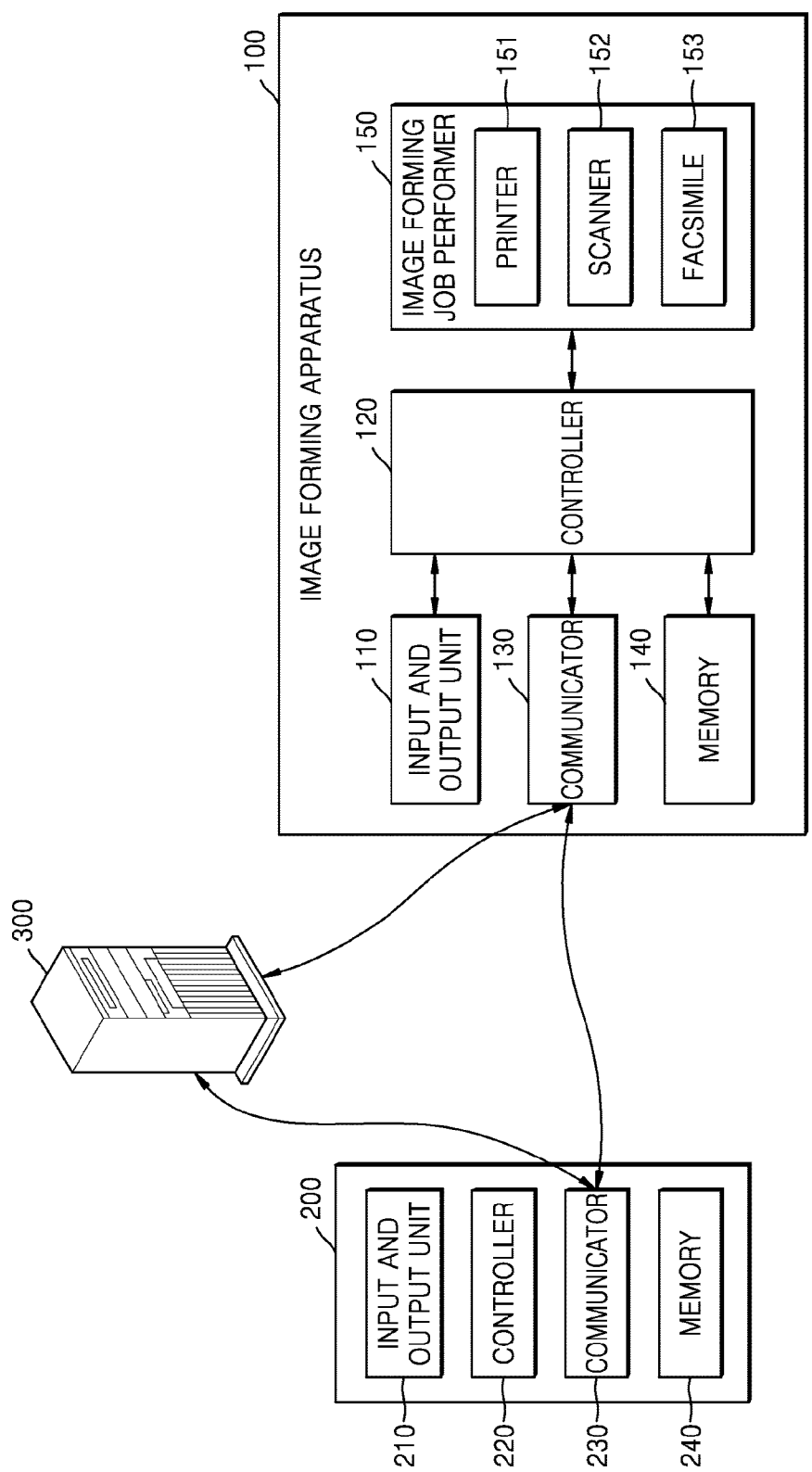

[Fig. 3]
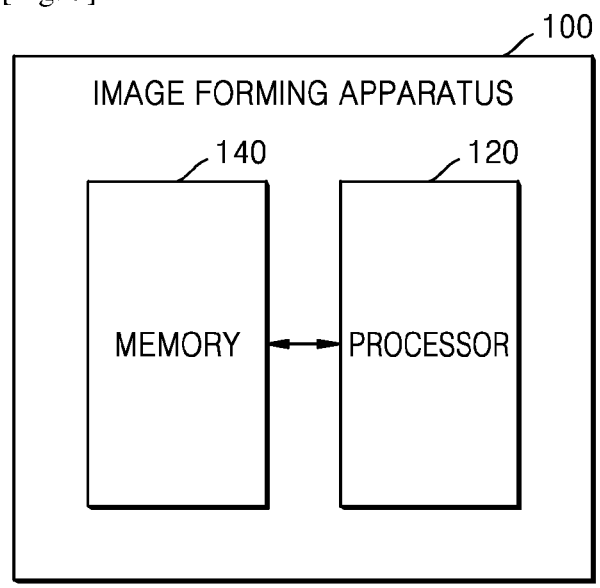

[Fig. 4]

| VM OPERATING ENVIRONMENT / VM OPERATING MODE | OPERATING ENVIRONMENT OF VIRTUAL MACHINE (420) ||||||
|---|---|---|---|---|---|---|
| | MEMORY ALLOCATION INFORMATION (430) ||| GARBAGE COLLECTION INFORMATION (440) ||| |
| | HEAP OLD | HEAP NEW | PERM | CMS OCCUPANCY MODE | GC EXEC THRESHOLD | MEMORY COMPACTION | OPTION... |
| GENERAL JOB MODE | MIDDLE | MIDDLE | MIDDLE | TRUE | 75% | FALSE | - |
| LIGHT JOB MODE | LOW | LOW | LOW | FALSE | 66% | FALSE | - |
| HEAVY JOB MODE | LOW | HIGH | LOW | TRUE | 80% | TRUE | - |
| MULTI-JOB MODE | LOW | HIGH | LOW | TRUE | 80% | TRUE | - |
| SOLUTION-INSTALLED PROGRAM OPERATING MODE | HIGH | LOW | HIGH | TRUE | 80% | TRUE | - |
| CUSTOM SETTING MODE | - | - | - | - | - | - | - |
| AUTOMATIC SETTING MODE | - | - | - | - | - | - | - |

OPERATING MODE OF VIRTUAL MACHINE (410)

400

[Fig. 5]
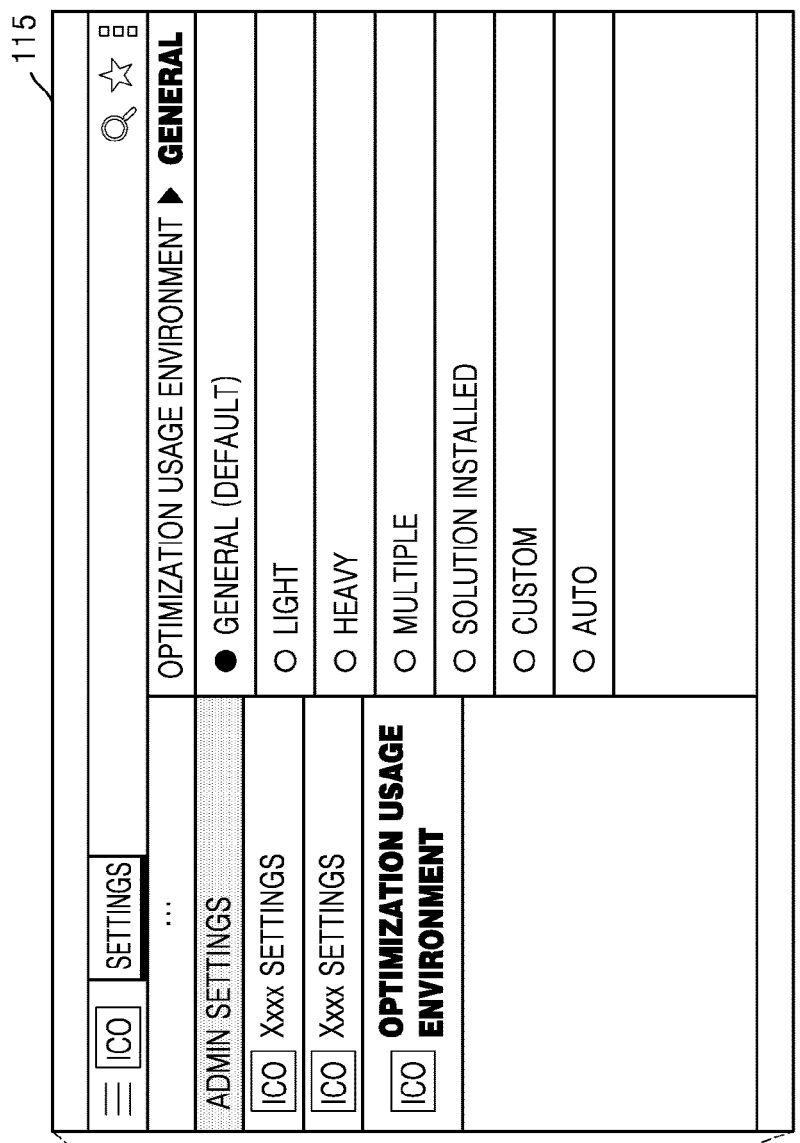
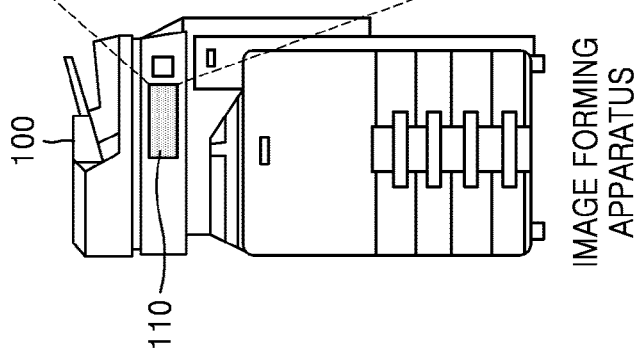
IMAGE FORMING APPARATUS

[Fig. 6]

| VM OPERATING MODE | GENERAL | LIGHT | HEAVY | MULTIPLE | SOLUTION INSTALLED | CUSTOM | AUTO |
|---|---|---|---|---|---|---|---|
| SELECTED OR NOT? | CHECKED | – | – | – | – | – | – |

600 ⎯

| VM OPERATING ENVIRONMENT | HEAP OLD | HEAP NEW | PERM | CMS OCCUPANCY MODE | GC RATIO | MEMORY COMPACTION | OPTION.... |
|---|---|---|---|---|---|---|---|
| SETTING | MIDDLE | MIDDLE | MIDDLE | TRUE | 75% | False | – |

610 ⎯

[Fig. 7]
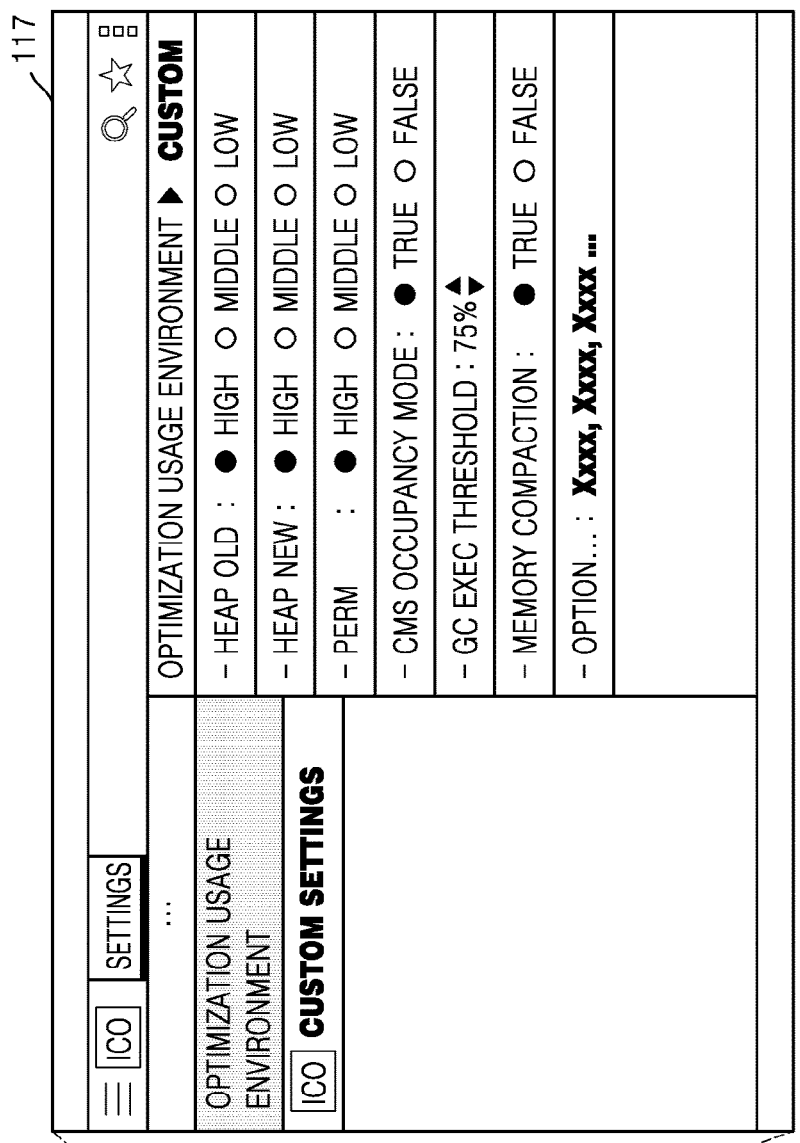
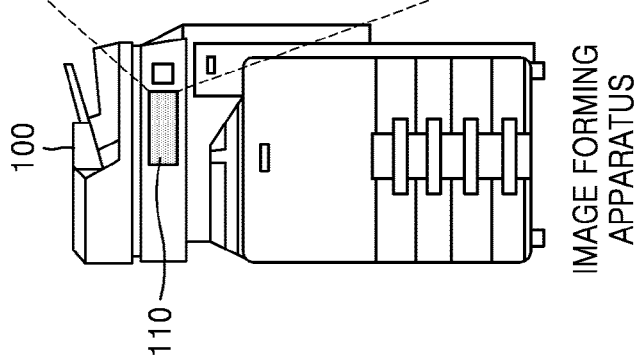

[Fig. 8]

| 800 | VM OPERATING MODE | GENERAL | LIGHT | HEAVY | MULTIPLE | SOLUTION INSTALLED | CUSTOM | AUTO |
|---|---|---|---|---|---|---|---|---|
| | SELECTED OR NOT? | - | - | - | - | - | - | - |

| 810 | VM OPERATING ENVIRONMENT | HEAP OLD | HEAP NEW | PERM | CMS OCCUPANCY MODE | GC RATIO | MEMORY COMPACTION | OPTION.... |
|---|---|---|---|---|---|---|---|---|
| | SETTING | HIGH | HIGH | HIGH | TRUE | 75% | TRUE | Xxxx, Xxxx, Xxxx |

[Fig. 9]
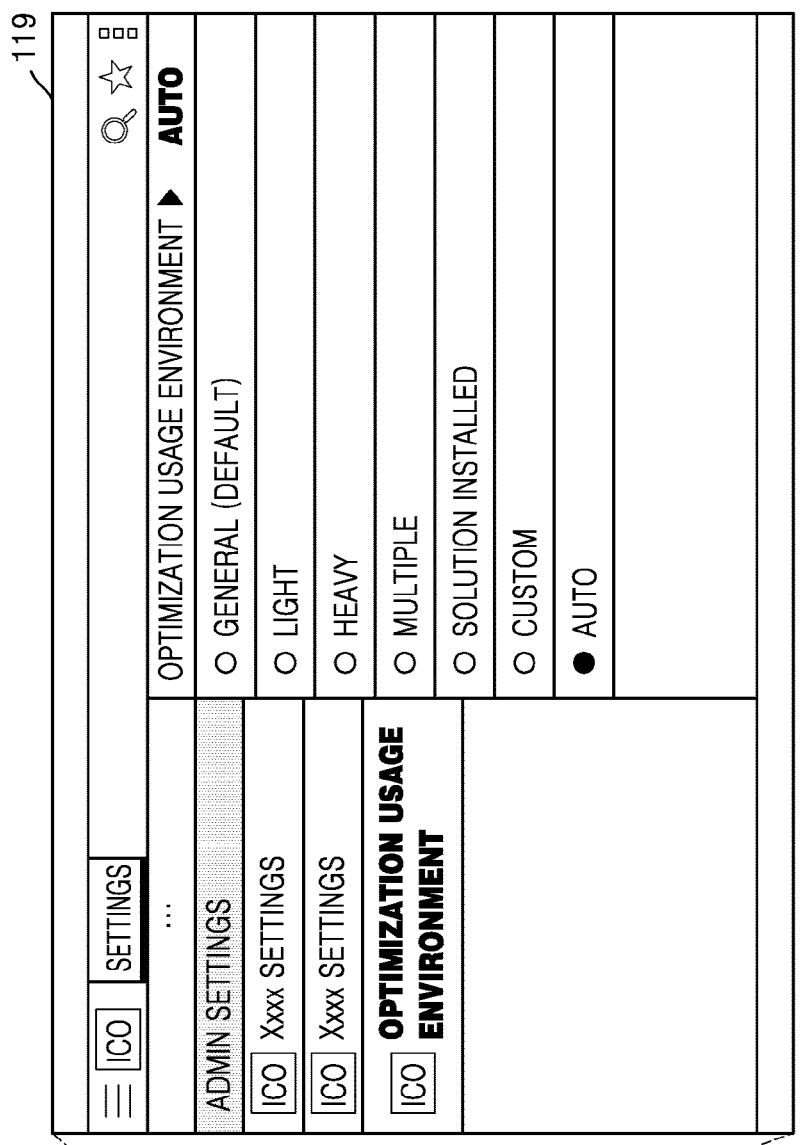
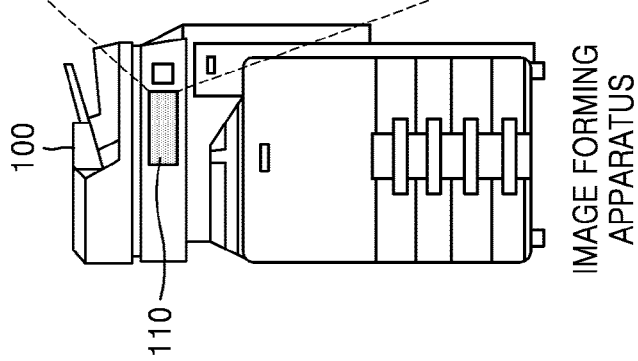

[Fig. 10]

| VM OPERATING MODE | GENERAL | LIGHT | HEAVY | MULTIPLE | SOLUTION INSTALLED | CUSTOM | AUTO |
|---|---|---|---|---|---|---|---|
| SELECTED OR NOT? | – | – | – | – | – | – | CHECKED |

1000

| JOB HISTORY | GENERAL | LIGHT | HEAVY | MULTIPLE | SOLUTION INSTALLED |
|---|---|---|---|---|---|
| CUMULATIVE VALUE | 30 | 80 | 10 | 30 | FALSE |

1010

| VM AUTOMATIC SETTING MODE | GENERAL | LIGHT | HEAVY | MULTIPLE | SOLUTION INSTALLED |
|---|---|---|---|---|---|
| SELECTED OR NOT? | – | CHECKED | – | – | – |

1020

[Fig. 11]
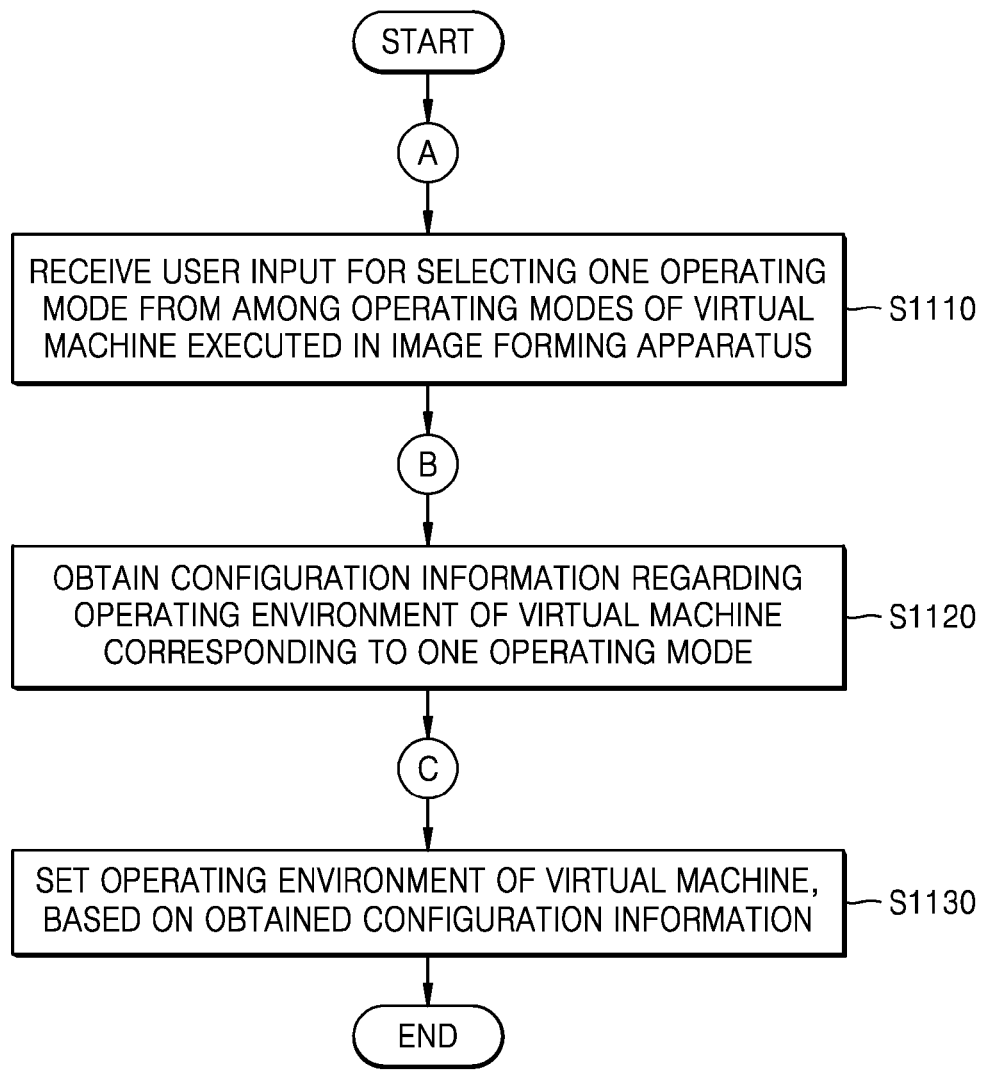
[Fig. 12]
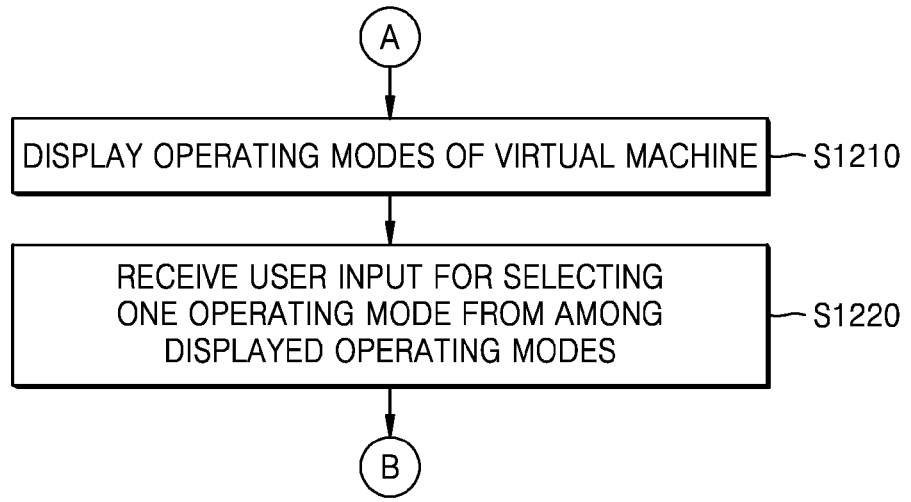

[Fig. 13]
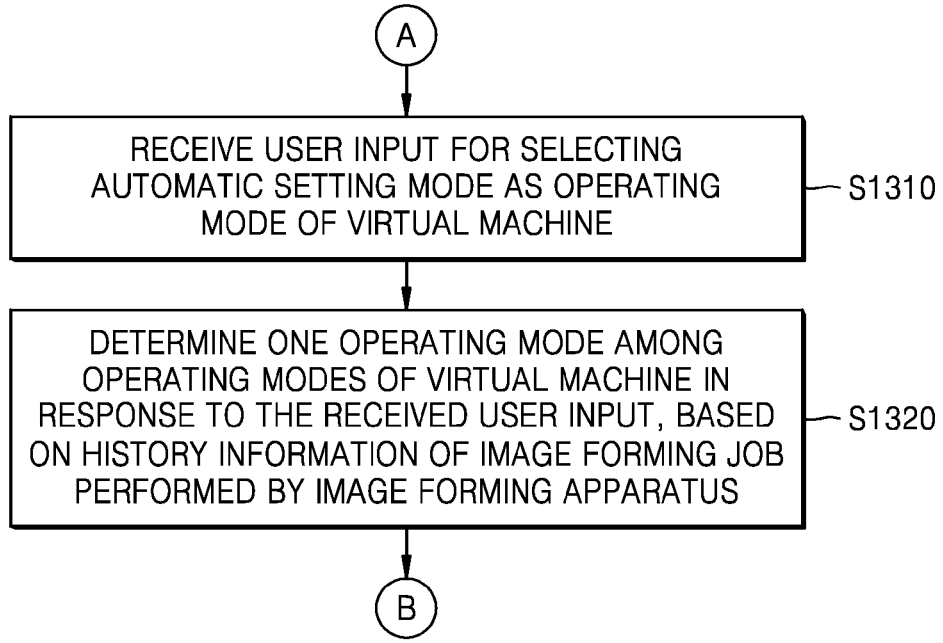
[Fig. 14]
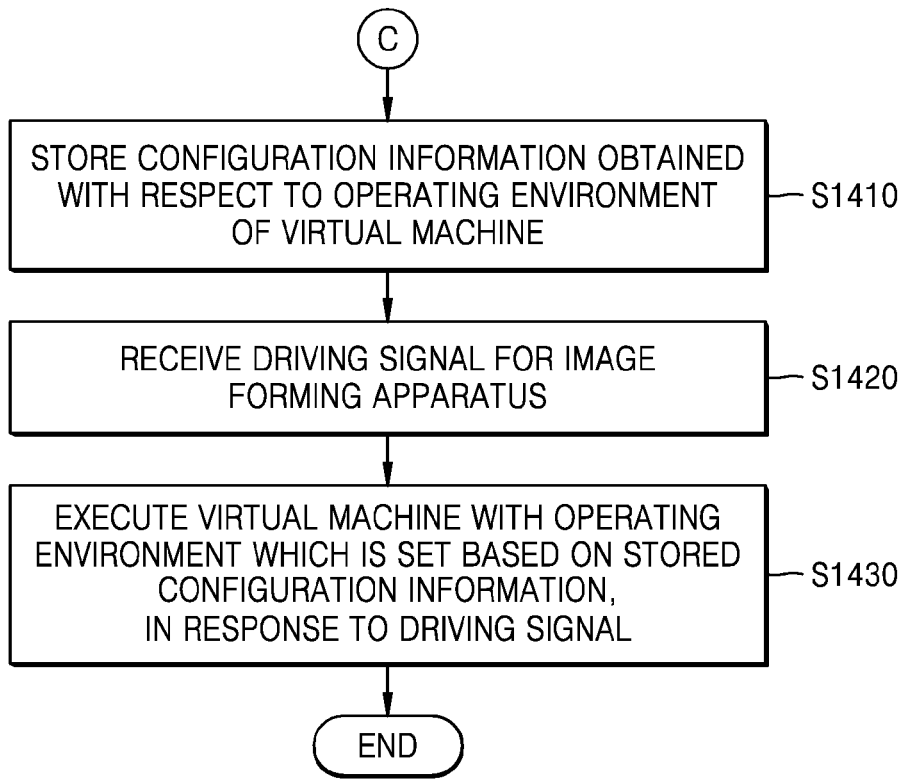

OPTIMIZING OPERATING ENVIRONMENT OF VIRTUAL MACHINE

BACKGROUND ART

A virtual machine executed in an image forming apparatus supports an image forming job performed by the image forming apparatus. The image forming apparatus performs various image forming jobs such as printing, scanning, faxing, etc. by using a virtual machine installed therein.

BRIEF DESCRIPTION OF DRAWINGS

These and/or other aspects will become apparent and more readily appreciated from the following description of the examples, taken in conjunction with the accompanying drawings in which:

FIG. 1 is a block diagram of an image forming apparatus according to an example;

FIG. 2 is a diagram illustrating a structure of an image forming apparatus according to an example and a structure of an external device;

FIG. 3 is a diagram illustrating a structure of an image forming apparatus for optimizing an operating environment of a virtual machine executed therein, according to an example;

FIG. 4 is a table showing examples of an operating mode of a virtual machine and an operating environment of the virtual machine corresponding to the operating mode of the virtual machine, according to an example;

FIG. 5 is a diagram illustrating an example in which a general job mode is selected as an operating mode of a virtual machine executed in an image forming apparatus according to an example;

FIG. 6 is a diagram illustrating an example in which an operating environment of a virtual machine is set in the general job mode by an image forming apparatus according to an example;

FIG. 7 is a diagram illustrating an example in which a custom setting mode is selected as an operating mode of a virtual machine executed in an image forming apparatus according to an example;

FIG. 8 is a diagram illustrating an example in which an operating environment of a virtual machine is set in the custom setting mode by an image forming apparatus according to an example;

FIG. 9 is a diagram illustrating an example in which an automatic setting mode is selected as an operating mode of a virtual machine executed in an image forming apparatus according to an example;

FIG. 10 is a diagram illustrating an example in which an operating environment of a virtual machine is set in the automatic setting mode by an image forming apparatus according to an example;

FIG. 11 is a flowchart of a method of optimizing an operating environment of a virtual machine executed in an image forming apparatus, performed by the image forming apparatus, according to an example;

FIG. 12 is a flowchart of a method of receiving a user input regarding an operating mode of a virtual machine executed in an image forming apparatus, performed by the image forming apparatus, according to an example;

FIG. 13 is a flowchart of a method of setting an operating environment of a virtual machine in the automatic setting mode, performed by an image forming apparatus, according to an example; and FIG. 14 is a flowchart of a method of executing a virtual machine in response to a driving signal for an image forming apparatus, performed by the image forming apparatus, according to an example.

Throughout the drawings, it should be noted that like reference numbers are used to depict the same or similar elements, features, and structures.

MODE FOR THE INVENTION

Reference will now be made to examples, which are illustrated in the accompanying drawings. In this regard, the examples may have different forms and should not be construed as being limited to the descriptions set forth herein. In order to further clearly describe features of the examples, descriptions of other features that are well known to one of ordinary skill in the art are omitted here.

In the specification, when an element is "connected" to another element, the elements may not only be "directly connected", but may also be "electrically connected" via another element therebetween. Also, when a region "includes" an element, the region may further include another element instead of excluding the other element, unless otherwise differently stated.

In the specification, an "image forming job" may denote any one of various jobs (for example, printing, copying, scanning, and faxing) related to an image, such as forming of an image or generating/storing/transmitting of an image file, and a "job" may denote not only an image forming job, but may also denote a series of processes to perform the image forming job.

Also, an "image forming apparatus" may denote any apparatus capable of performing an image forming job, such as a printer, a scanner, a fax machine, a multi-function printer (MFP), or a display apparatus.

Also, "print data" may denote data having a format printable by a printer.

Also, a "scan file" may denote a file generated by scanning an image by using a scanner.

Also, a "user" may denote a person who performs manipulation related to an image forming job by using an image forming apparatus or a device connected to the image forming apparatus wirelessly or via wires.

As used herein, expressions such as "at least one of," when preceding a list of elements, modify the entire list of elements and do not modify the individual elements of the list.

FIG. 1 is a block diagram of an image forming apparatus 100 according to an example. Referring to FIG. 1, the image forming apparatus 100 according to an example may include an input and output unit 110, a controller 120, a communicator 130, a memory 140, and an image forming job performer 150. Also, although not illustrated in FIG. 1, the image forming apparatus 100 may further include a power supplier for supplying power to each component of the image forming apparatus 100.

The input and output unit 110 may include an input unit for receiving, from a user, an input for performing an image forming job, and an output unit for displaying information, such as a result of performing an image forming job or a state of the image forming apparatus 100. For example, the input and output unit 110 may include an operation panel for receiving a user input and a display panel for displaying a screen.

The input unit may include, for example, at least one of devices for receiving various types of user inputs, such as a keyboard, a physical button, a touch screen, a camera, or a microphone. Also, the output unit may include, for example, a display panel or a speaker. However, an example is not limited thereto, and the input and output unit 110 may include at least one device supporting various inputs and outputs.

In one example, the input and output unit 110 may display operating modes of a virtual machine, and configuration information regarding an operating environment of the virtual machine corresponding to each of the operating modes of the virtual machine. Furthermore, the input and output unit 110 may receive a user input for selecting an operating mode, and a user input for setting configuration information regarding an operating environment.

The image forming apparatus 100 may include at least one processor, e.g., the controller 120. The controller 120 controls operations of the image forming apparatus 100, and may include a processor, such as a central processing unit (CPU). The controller 120 may control other components included in the image forming apparatus 100 such that an operation corresponding to a user input received through the input and output unit 110 is performed.

For example, the controller 120 may execute a program stored in the memory 140, read a file stored in the memory 140, or store a new file in the memory 140.

The communicator 130 may communicate with another device or a network in a wired or wireless manner. Accordingly, the communicator 130 may include a communication module supporting at least one of various wired or wireless communication methods. For example, the communication module may be in a form of a chipset or may be a sticker or a barcode (for example, a sticker including a near field communication (NFC) tag) including information for communication.

Wireless communication may include, for example, at least one of wireless fidelity (Wi-Fi), Wi-Fi direct, Bluetooth, ultra wideband (UWB), or NFC. Wired communication may include, for example, at least one of universal serial bus (USB) or high definition multimedia interface (HDMI).

The communicator 130 may be connected to an external apparatus 200 provided outside the image forming apparatus 100 to transmit and receive a signal or data to and from the external apparatus 200. Referring to FIG. 2, the image forming apparatus 100 is connected to the external apparatus 200 through the communicator 130. In an example, the communicator 130 may be connected directly with the external apparatus 200. In an example, the communicator 130 may be connected with the external apparatus 200 through an apparatus such as a server 300. The communicator 130 may transmit a signal or data received from the external apparatus 200 to the controller 120, or transmit a signal or data generated by the controller 120 to the external apparatus 200. For example, when the communicator 130 receives a print command signal or print data from the external apparatus 200, the controller 120 may output the print data through a printer 151.

As shown in FIG. 2, the external apparatus 200 may include an input and output unit 210, a controller 220, a communicator 230, and a memory 240.

The controller 220 may control an image forming job by executing a program stored in the memory 240 and transmitting a signal or data generated as a result of executing the program to the image forming apparatus 100 through the communicator 230.

Referring back to FIG. 1, the various types of data, such as a file or a program like an application, may be installed and stored in the memory 140. The controller 120 may access the data stored in the memory 140 to use the data, or may store new data in the memory 140. Also, the controller 120 may execute the program installed in the memory 140. Also, the controller 120 may install an application received from an external source through the communicator 130 in the memory 140.

The image forming job performer 150 may perform an image forming job, such as printing, scanning, or faxing.

Referring to FIG. 1, the image forming job performer 150 includes the printer 151, a scanner 152, and a facsimile 153, but as occasion demands, the image forming job performer 150 may include some of them or may further include a component for performing another type of image forming job.

The printer 151 may form an image on a recording medium via any one of various printing methods, such as an electrophotography method, an inkjet method, a thermal transfer method, and a thermal method.

The scanner 152 may irradiate light onto paper and receive light reflected from the paper to read an image recorded on the paper. Examples of an image sensor for reading an image from paper include a charge-coupled device (CCD) and a contact type image sensor (CIS). The scanner 152 may have a flatbed structure in which paper is located at a fixed location and an image sensor moves to read an image, a document feed structure in which an image sensor is located at a fixed location and paper is transferred, or a combination structure thereof.

The facsimile 153 may share a component for scanning an image with the scanner 152, share a component for printing a received file with the printer 151, transmit a scan file to a destination, or receive a file from an external source.

FIG. 3 is a diagram illustrating a structure of an image forming apparatus 100 for optimizing an operating environment of a virtual machine executed therein, according to an example.

Referring to FIG. 3, the image forming apparatus 100 according to an example of the present disclosure may include a processor 120 and a memory 140. The image forming apparatus 100 may further include other components or may include only one of these components.

These components will be described below.

The processor 120 may control other components included in the image forming apparatus 100.

The processor 120 may execute a computer executable instruction to obtain configuration information regarding an operating environment of the virtual machine executed in the image forming apparatus 100, the operating environment corresponding to an operating mode selected by a user from among operating modes of the virtual machine.

The processor 120 may set the operating environment of the virtual machine on the basis of the obtained configuration information.

The processor 120 may set the operating environment of the virtual machine on the basis of previously stored configuration information corresponding to an operating mode. The processor 120 may set the operating environment of the virtual machine, based on configuration information received from a user corresponding to the operating mode.

Furthermore, the processor 120 may receive a driving signal for the image forming apparatus 100. The processor 120 may execute the virtual machine, the operating environment of which is set on the basis of stored configuration information regarding the operating environment of the virtual machine, in response to the driving signal.

The memory 140 may store the computer executable instruction.

Furthermore, the memory 140 may store the obtained configuration information regarding the operating environment of the virtual machine.

FIG. 4 is a table 400 showing examples of an operating mode of a virtual machine and an operating environment of the virtual machine corresponding to the operating mode of the virtual machine, according to an example.

Referring to FIG. 4, the table 400 may include an operating mode 410 of the virtual machine and an operating environment 420 of the virtual machine.

In one example, the operating mode 410 of the virtual machine may be classified according to features of an image forming job performed by the image forming apparatus 100.

For example, the operating mode 410 of the virtual machine may be classified according to the number of sheets of paper on which an image forming job is performed by the image forming apparatus 100, whether different image forming jobs are simultaneously performed, the presence of a program driven on the virtual machine, and the like. Alternatively, for example, the operating mode 410 of the virtual machine may be classified according to whether a user input regarding configuration information is received or not or whether the operating mode 410 of the virtual machine is automatically selected or not by the processor 120.

However, the operating mode 410 of the virtual machine may be classified and set on the basis of various criteria and is thus not limited by the examples set forth herein.

Examples of the operating mode 410 of the virtual machine may include a general job mode, a light job mode, a heavy job mode, a multi-job mode, a program operating mode, a custom setting mode, and an automatic setting mode.

The general job mode may be the operating mode 410 of the virtual machine corresponding to the image forming apparatus 100 performing a general-purpose image forming job. The general job mode may be set as an initial value of the operating mode 410 of the virtual machine executed in the image forming apparatus 100.

The light job mode may be the operating mode 410 of the virtual machine corresponding to the image forming apparatus 100 performing an image forming job on a small number of sheets of paper. The heavy job mode may be the operating mode 410 of the virtual machine corresponding to the image forming apparatus 100 performing an image forming job on a large number of sheets of paper.

The multi-job mode may be the operating mode 410 of the virtual machine corresponding to the image forming apparatus 100 performing different image forming jobs simultaneously or within a predetermined threshold range. For example, the operating mode 410 of the virtual machine executed in the image forming apparatus 100 in which a job of printing a document and faxing a document, a job of scanning a document and faxing a document, or the like is performed may be set to be the multi-job mode.

The program operating mode may be the operating mode 410 of the virtual machine corresponding to the image forming apparatus 100 in which at least one program is driven on the virtual machine. For example, when a 'user authentication program' or a 'job history cumulative count program' is installed and executed in the image forming apparatus 100, the operating mode 410 of the virtual machine executed in the image forming apparatus 100 may be set to be the program operating mode.

The custom setting mode may be the operating mode 410 of the virtual machine, in which the operating environment 420 of the virtual machine is set on the basis of configuration information regarding the operating environment 420 of the virtual machine which is received from a user. For example, the user may optimize the image forming apparatus 100 in a usage environment by directly setting the operating environment 420 of the virtual machine which is in accord with the usage environment but is not pre-set.

The automatic setting mode may be the operating mode 410 of the virtual machine which is automatically determined by the image forming apparatus 100 on the basis of history information of an image forming job performed by the image forming apparatus 100. For example, the image forming apparatus 100 may count history information of image forming jobs and select the operating mode 410 of the virtual machine which is appropriate for an image forming job having a largest cumulative value.

In one example, the configuration information regarding the operating environment 420 of the virtual machine may include at least one of memory allocation information 430 of a memory available to the virtual machine or garbage collection information 440.

In one example, the memory allocation information 430 of the memory may include information for assigning a memory region available to the virtual machine to an old region, a new region, or a permanent region according to features of an image forming job performed by the image forming apparatus 100. The memory regions available to the virtual machine may be classified as, but are not limited to, the old region in which instances used by the virtual machine continuously or for a threshold time or more are stored, the new region in which newly created instances are stored, the permanent region in which a class or a method of the virtual machine is stored, and the like.

In one example, the garbage collection information 440 of the virtual machine may include information such as whether a garbage collection job is to be performed according to a memory utilization threshold value, the memory utilization threshold value at which the garbage collection job is performed, whether full garbage collection (GC) is to be performed, etc.

In the general job mode, the memory regions available to the virtual machine may be assigned equally to the old region, the new region, and the permanent region. The general job mode may be set such that a garbage collection memory utilization threshold value is 75%, garbage collection is to be performed according to the memory utilization threshold value, and full GC is not to be performed.

In the light job mode, the memory regions available to the virtual machine may be assigned such that large memory regions are assigned to the old region and the new region and a small memory region is assigned to the permanent region. Furthermore, the light job mode may be set such that the garbage collection memory utilization threshold value is 66%, garbage collection is not to be performed according to the memory utilization threshold value, and full GC is not to be performed.

In the heavy job mode, the memory regions available to the virtual machine may be assigned such that small memory regions are assigned to the old region and the permanent region and a large memory region is assigned to the new region. Furthermore, the heavy job mode may be set such that the garbage collection memory utilization threshold value is 80%, garbage collection is to be performed according to the memory utilization threshold value, and full GC is to be performed.

In the multi-job mode, the memory regions available to the virtual machine may be assigned such that small memory regions are assigned to the old region and the permanent region and a large memory region is assigned to the new region. Furthermore, the multi-job mode may be set such that the garbage collection memory utilization threshold value is 80%, garbage collection is to be performed according to the memory utilization threshold value, and full GC is to be performed.

In the program operating mode, the memory regions available to the virtual machine may be assigned such that large memory regions are assigned to the old region and the permanent region and a small memory region is assigned to the new region. Furthermore, the heavy job mode may be set such that the garbage collection memory utilization threshold value is 80%, garbage collection is to be performed according to the memory utilization threshold value, and full GC is to be performed.

However, the configuration information regarding the operating environment 420 of the virtual machine corresponding to the operating mode 410 of the virtual machine may be set variously and is not limited to the examples set forth herein.

FIG. 5 is a diagram illustrating an example in which the general job mode is selected as an operating mode of a virtual machine executed in an image forming apparatus 100 according to an example.

Referring to FIG. 5, the input and output unit 110 may display an operating-mode setting screen 115 for setting an operating mode of the virtual machine. The operating-mode setting screen 115 may display an operating mode list including the general job mode, the light job mode, the heavy job mode, the multi-job mode, the program operating mode, the custom setting mode, and the automatic setting mode, and a button image for selecting each of these operating modes.

The input and output unit 110 may receive a user input for selecting the general job mode from among the operating modes of the virtual machine. The input and output unit 110 may sense a user input touching the button image for selecting the general job mode in the operating-mode setting screen 115.

When the user input for selecting the general job mode as an operating mode of the virtual machine is received, the processor 120 may obtain configuration information of an operating environment corresponding to the general job mode.

In one example, the processor 120 may obtain previously stored configuration information corresponding to the general job mode, and obtain information from a user corresponding to the general job mode.

FIG. 6 is a diagram illustrating an example in which an operating environment of a virtual machine is set in the general job mode by the image forming apparatus 100 according to an example.

Referring to FIG. 6, the processor 120 may set an operating environment of the virtual machine on the basis of obtained configuration information corresponding to the general job mode. The memory 140 may store the set operating environment of the virtual machine.

In one example, the memory 140 may store a selected operating mode and values of an operating-environment table 610 of the virtual machine corresponding to the selected operating mode.

For example, referring to an operating-mode table 600 of the virtual machine, the memory 140 may store the general job mode selected as an operating mode.

Referring to the operating environment table 610 of the virtual machine, the memory 140 may store an operating environment set such that memory regions available to the virtual machine are equally assigned to an old region, a new region, and a permanent region. Furthermore, the memory 140 may store the operating environment which is set such that the garbage collection memory utilization threshold value is 75%, garbage collection is to be performed according to the memory utilization threshold value, and full GC is not to be performed.

Similar to the examples illustrated in FIGS. 5 and 6, the light job mode, the heavy job mode, the multi-job mode, or the program operating mode may be selected as the operating mode 410 of the virtual machine. Furthermore, similar to the examples illustrated in FIGS. 5 and 6, an operating environment of the virtual machine may be set or stored.

FIG. 7 is a diagram illustrating an example in which the custom setting mode is selected as an operating mode of a virtual machine executed in an image forming apparatus 100 according to an example.

Referring to FIG. 7, an input and output unit 110 may receive a user input for selecting the custom setting mode from among operating modes of the virtual machine. The input and output unit 110 may sense a user input touching a button image for selecting the custom setting mode in an operating-mode setting screen (not shown).

When a user input for selecting the custom setting mode as an operating mode of the virtual machine is received, the input and output unit 110 may display an operating-environment setting screen 117 for setting an operating environment of the virtual machine.

In one example, the operating-environment setting screen 117 may display examples which are selectable to set assignment information regarding a memory available to the virtual machine or garbage collection information. Alternatively, the operating-environment setting screen 117 may display an image for receiving an input regarding either the assignment information regarding the memory available to the virtual machine or the garbage collection information.

The input and output unit 110 may receive a user input for setting configuration information regarding an operating environment of the virtual machine. The input and output unit 110 may sense a user's touch selecting or inputting the configuration information in the operating-environment setting screen 117.

When a user input for selecting the custom setting mode as an operating mode of the virtual machine is received, the processor 120 may obtain configuration information regarding an operating environment corresponding to the custom setting mode.

In one example, the processor 120 may obtain previously stored configuration information corresponding to the custom setting mode, and obtain information from a user corresponding to the custom setting mode.

FIG. 8 is a diagram illustrating an example in which an operating environment of a virtual machine is set in the custom setting mode by an image forming apparatus 100 according to an example.

Referring to FIG. 8, the processor 120 may set an operating environment of the virtual machine on the basis of obtained configuration information corresponding to the custom setting mode. The memory 140 may store the set operating environment of the virtual machine.

In one example, the memory 140 may store a selected operating mode of the virtual machine and values of an operating-environment table 810 of the virtual machine corresponding to the operating mode.

For example, referring to an operating-mode table 800 of the virtual machine, the memory 140 may store the custom setting mode selected as an operation mode.

Referring to the operating-environment table 810 of the virtual machine, the memory 140 may store an operating environment which is set such that large memory regions available to the virtual machine are assigned to all of an old region, a new region, and a permanent region. Furthermore, the memory 140 may store an operating environment which is set such that a garbage collection memory utilization threshold value is 75%, garbage collection is to be performed according to a memory utilization threshold value, and full GC is to be performed.

FIG. 9 is a diagram illustrating an example in which the automatic setting mode is selected as an operating mode of a virtual machine executed in an image forming apparatus 100 according to an example.

Referring to FIG. 9, an input and output unit 110 may receive a user input for selecting the automatic setting mode from among operating modes of the virtual machine. The input and output unit 110 may sense a user input touching a button image for selecting the automatic setting mode in an operating-mode setting screen 119.

The processor 120 may determine one of the operating modes of the virtual machine on the basis of history information of an image forming job performed by the image forming apparatus 100, in response to a user input for selecting the automatic setting mode as an operating mode of the virtual machine.

In one example, when a job is completed by the image forming apparatus 100, the processor 120 may cumulatively store history information of the image forming job in the memory 140.

For example, the history information of the image forming job may be information obtained by cumulatively recording features of the performed image forming job. The features of the image forming job may include, but are not limited to, the number of jobs performed simultaneously, the number of sheets of paper on which a printing job was performed, the number of sheets of paper on which a scanning job was performed, the number of sheets of paper on which a faxing job was performed, the number of programs running on the virtual machine, etc.

When the image forming job is completed, the processor 120 may select one of a general job value, a light job value, a heavy job value, a multi-job value, a program operation value, etc. on the basis of features of a job and cumulatively store selected values in the memory 140.

The processor 120 may determine an operating mode by analyzing accumulated job history information. In one example, the processor 120 may determine an operating mode corresponding to a job having a largest cumulative value.

The processor 120 may obtain configuration information regarding an operating environment corresponding to a determined job mode.

The processor 120 may obtain previously stored configuration information corresponding to the determined operating mode, and obtain information from a user corresponding to the determined operating mode.

FIG. 10 is a diagram illustrating an example in which an operating environment of a virtual machine is set in the automatic setting mode by an image forming apparatus 100 according to an example.

Referring to FIG. 10, the processor 120 may determine an operating mode by analyzing accumulated job history information. The processor 120 may set an operating environment of the virtual machine on the basis of configuration information corresponding to the operating mode. The memory 140 may store the set operating environment of the virtual machine.

In one example, referring to an operating-mode table 1000 of the virtual machine, the memory 140 may store the automatic setting mode selected as an operating mode.

Referring to a job history information table 1010, the memory 140 may store a history value of a performed image forming job. For example, the memory 140 may cumulatively store whether the performed image forming job corresponds to a general job value, a light job value, a heavy job value, a multi-job value, or a program operation value.

The processor 120 may determine an operating mode by analyzing the accumulated job history information. The processor 120 may determine a light job mode having a largest cumulative value in the job history information table 1010 to be an operating mode.

The memory 140 may store an operating mode to be set when the automatic setting mode is selected as the operating mode. For example, referring to an automatic setting mode table 1020, the memory 140 may store, as the light job mode, an operating mode to be set when the automatic setting mode is selected.

Furthermore, the processor 120 may obtain configuration information regarding an operating environment corresponding to the determined light job mode.

FIG. 11 is a flowchart of a method of optimizing an operating environment of a virtual machine executed in the image forming apparatus 100, performed by the image forming apparatus 100, according to an example.

Referring to FIG. 11, in operation S1110, the image forming apparatus 100 may receive a user input for selecting an operating mode from among operating modes of the virtual machine executed in the image forming apparatus 100.

In operation S1120, the image forming apparatus 100 may obtain configuration information regarding an operating environment of the virtual machine corresponding to the operating mode.

In one example, configuration information regarding an operating environment of the virtual machine corresponding to each of the operating modes of the virtual machine may be previously stored in the image forming apparatus 100. The image forming apparatus 100 may obtain the previously stored configuration information corresponding to the operating mode.

In one example, the image forming apparatus 100 may receive, from a user, configuration information regarding an operating environment of the virtual machine corresponding to an operating mode of the virtual machine. The image forming apparatus 100 may receive configuration information from a user corresponding to the operating mode.

In operation S1130, the image forming apparatus 100 may set an operating environment of the virtual machine on the basis of the obtained configuration information.

In one example, the image forming apparatus 100 may change a predetermined operating environment of the virtual machine on the basis of the obtained configuration information.

FIG. 12 is a flowchart of a method of receiving a user input regarding an operating mode of a virtual machine executed in the image forming apparatus 100, performed by the image forming apparatus 100, according to an example.

In operation S1210, the image forming apparatus 100 may display operating modes of the virtual machine.

In operation S1220, the image forming apparatus 100 may receive a user input for selecting operating mode from among the displayed operating modes.

FIG. 13 is a flowchart of a method of setting an operating environment of a virtual machine in the automatic setting mode, performed by the image forming apparatus 100, according to an example.

In operation S1310, the image forming apparatus 100 may receive a user input for selecting the automatic setting mode as an operating mode of the virtual machine.

In operation S1320, the image forming apparatus 100 may determine one among operating modes of the virtual machine in response to the received user input, based on history information of an image forming job performed by the image forming apparatus 100.

FIG. 14 is a flowchart of a method of executing a virtual machine in response to a driving signal for the image forming apparatus 100, performed by the image forming apparatus 100, according to an example.

In operation S1410, the image forming apparatus 100 may store configuration information obtained with respect to an operating environment of the virtual machine.

In operation S1420, the image forming apparatus 100 may receive a driving signal for the image forming apparatus 100.

Examples of the driving signal for the image forming apparatus 100 may include, but are not limited to, a signal for powering off the image forming apparatus 100, a signal for powering on the image forming apparatus 100, a signal for rebooting the image forming apparatus 100, a signal for powering off the virtual machine executed in the image forming apparatus 100, a signal for powering on the virtual machine executed in the image forming apparatus 100, a signal for rebooting the virtual machine executed in the image forming apparatus 100, and the like.

In one example, the image forming apparatus 100 may be set such that the driving signal is generated at predetermined time intervals. The image forming apparatus 100 may receive the driving signal generated at the predetermined time intervals.

For example, the image forming apparatus 100 may be set such that the driving signal for rebooting is generated once per week. The image forming apparatus 100 may receive a rebooting signal once per week.

In operation S1430, the image forming apparatus 100 may execute the virtual machine, the operating environment of which is set based on the stored configuration information regarding the operating environment of the virtual machine, in response to the driving signal.

In one example, the image forming apparatus 100 may be powered off or on or be rebooted, in response to the driving signal. When the image forming apparatus 100 is driven again, the stored configuration information regarding the operating environment of the virtual machine may be obtained. The image forming apparatus 100 may set the operating environment of the virtual machine according to the obtained configuration information and execute the virtual machine, the operating environment of which is set. Alternatively, the image forming apparatus 100 may execute the virtual machine, the operating environment of which is set based on the configuration information.

The above-described examples may be embodied in the form of a non-transitory computer-readable recording medium having recorded thereon instructions and data which can be executed in a computer. At least one of the instructions or the data may be stored in the form of program code, and a program module may be generated to perform an operation when least one of the instructions and the data is executed by a processor.

The non-transitory computer-readable recording medium may be understood to mean, for example, a magnetic storage medium such as a hard disc or an optical recording medium such as a compact disc (CD) and a digital versatile disc (DVD), or to mean a memory included in a server accessible via a network. For example, the non-transitory computer-readable recording medium may be understood to include at least one of the memory 140 or a memory of the input and output unit 110 of the image forming apparatus 100. Alternatively, the non-transitory computer-readable recording medium may be the memory 240 of the external device 200 connected to the image forming apparatus 100 via network.

While examples have been described with reference to the figures, it will be understood by those of ordinary skill in the art that various changes in form and details may be made therein without departing from the spirit and scope as defined by the following claims.

The invention claimed is:

1. An image forming apparatus comprising:
   a memory to store a computer executable instruction; and
   at least one processor, by executing the computer executable instruction, to:
      execute a virtual machine,
      receive a user selection of an operating mode of the virtual machine, and
      set an operating environment of the virtual machine based on configuration information corresponding to the selected operating mode,
   wherein the operating mode is selected by a user from among a plurality of operating modes of the virtual machine, and
   wherein the configuration information includes allocation information regarding a memory available to the virtual machine or garbage collection information.

2. The image forming apparatus of claim 1,
   wherein the configuration information corresponding to the selected operating mode is previously stored in the memory, and
   wherein the at least one processor is further to sets the operating environment of the virtual machine based on the previously stored configuration information.

3. The image forming apparatus of claim 1, further comprising an input and output unit to receive the configuration information corresponding to the selected operating mode from the user,
   wherein the at least one processor is further to set the operating environment of the virtual machine based on the configuration information corresponding to the selected operating mode and received from the user.

4. The image forming apparatus of claim 2, wherein the at least one processor is further to:
   receive a driving signal for the image forming apparatus, and
   execute the virtual machine, the operating environment of which is set based on the previously stored configuration information, in response to the received driving signal.

5. The image forming apparatus of claim 1, further comprising an input and output unit to receive a user input for selecting an automatic setting mode as the selected operating mode of the virtual machine,
   wherein the at least one processor is further to select the operating mode among the plurality of operating modes of the virtual machine in response to the received user input based on history information of an image forming job performed by the image forming apparatus.

6. The image forming apparatus of claim 5, wherein the history information of the image forming job performed by the image forming apparatus comprises information obtained by cumulatively recording features of the performed image forming job.

7. The image forming apparatus of claim 6, wherein the features of the performed image forming job comprise at least one of:
   a number of jobs performed simultaneously;
   a number of sheets of paper on which a printing job was performed;
   a number of sheets of paper on which a scanning job was performed;
   a number of sheets of paper on which a faxing job was performed; or
   a number of programs running on the virtual machine.

8. The image forming apparatus of claim 1, further comprising an input and output unit to receive a user input for displaying the plurality of operating modes of the virtual machine and a user input for selecting the operating mode from among the displayed plurality of operating modes.

9. The image forming apparatus of claim 1,
   wherein the information regarding a memory available to the virtual machine includes an old region, a new region, or a permanent region, and
   wherein the garbage collection information includes information of whether a garbage collection job is to be performed according to a memory utilization threshold value, a memory utilization threshold value at which the garbage collection is performed, or whether full garbage collection is to be performed.

10. A method of operating an image forming apparatus, the method comprising:
    executing a virtual machine in the image forming apparatus;
    receiving a user selection of an operating mode from among a plurality of operating modes of the virtual machine;
    obtaining configuration information corresponding to the selected operating mode; and
    setting an operating environment of the virtual machine based on the obtained configuration information,
    wherein the configuration information includes allocation information regarding a memory available to the virtual machine or garbage collection information.

11. The method of claim 10,
    wherein the configuration information corresponding to the selected operating mode is previously stored in the image forming apparatus, and
    wherein the obtaining of the configuration information comprises obtaining the previously stored configuration information corresponding to the operating mode.

12. The method of claim 10, further comprising receiving the configuration information corresponding to the selected operating mode from a user,
    wherein the setting of the operating environment based on the configuration information comprises setting the operating environment based on the configuration information received from the user.

13. The method of claim 11, further comprising:
    receiving a driving signal for the image forming apparatus; and
    executing the virtual machine, the operating environment of which is set based on the previously stored configuration information, in response to the received driving signal.

14. The method of claim 10, wherein the receiving of the user selection comprises:
    receiving a user input for selecting an automatic setting mode as the operating mode of the virtual machine; and
    selecting the operating mode among the plurality of operating modes of the virtual machine in response to the received user input based on history information of an image forming job performed by the image forming apparatus.

15. The method of claim 14, wherein the history information of the image forming job performed by the image forming apparatus comprises information obtained by cumulatively recording features of the performed image forming job.

16. The method of claim 15, wherein the features of the performed image forming job comprise at least one of:
    a number of jobs performed simultaneously;
    a number of sheets of paper on which a printing job was performed;
    a number of sheets of paper on which a scanning job was performed;
    a number of sheets of paper on which a faxing job was performed; or
    a number of programs running on the virtual machine.

17. The method of claim 10, wherein the receiving of the user input comprises:
    displaying the plurality of operating modes of the virtual machine; and
    receiving a user input for selecting the operating mode from among the displayed plurality of operating modes.

18. The method of claim 10, wherein the information regarding a memory available to the virtual machine includes an old region, a new region, or a permanent region, and
    wherein the garbage collection information includes information of whether a garbage collection job is to be performed according to a memory utilization threshold value, a memory utilization threshold value at which the garbage collection is performed, or whether full garbage collection is to be performed.

19. A non-transitory computer-readable recording medium having recorded thereon a program for operating an image forming apparatus, which, when executed by at least one processor of the image forming apparatus, cause the image forming apparatus to:
    execute a virtual machine in the image forming apparatus;
    receive a user selection of an operating mode from among a plurality of operating modes of the virtual machine;
    obtain configuration information corresponding to the selected operating mode; and
    set an operating environment of the virtual machine based on the obtained configuration information,
    wherein the configuration information includes allocation information regarding a memory available to the virtual machine or garbage collection information.

* * * * *